S. B. BLAKELY.
ELECTRIC CONTROLLING AND FEEDING APPARATUS.
APPLICATION FILED DEC. 29, 1915.
1,226,451. Patented May 15, 1917.
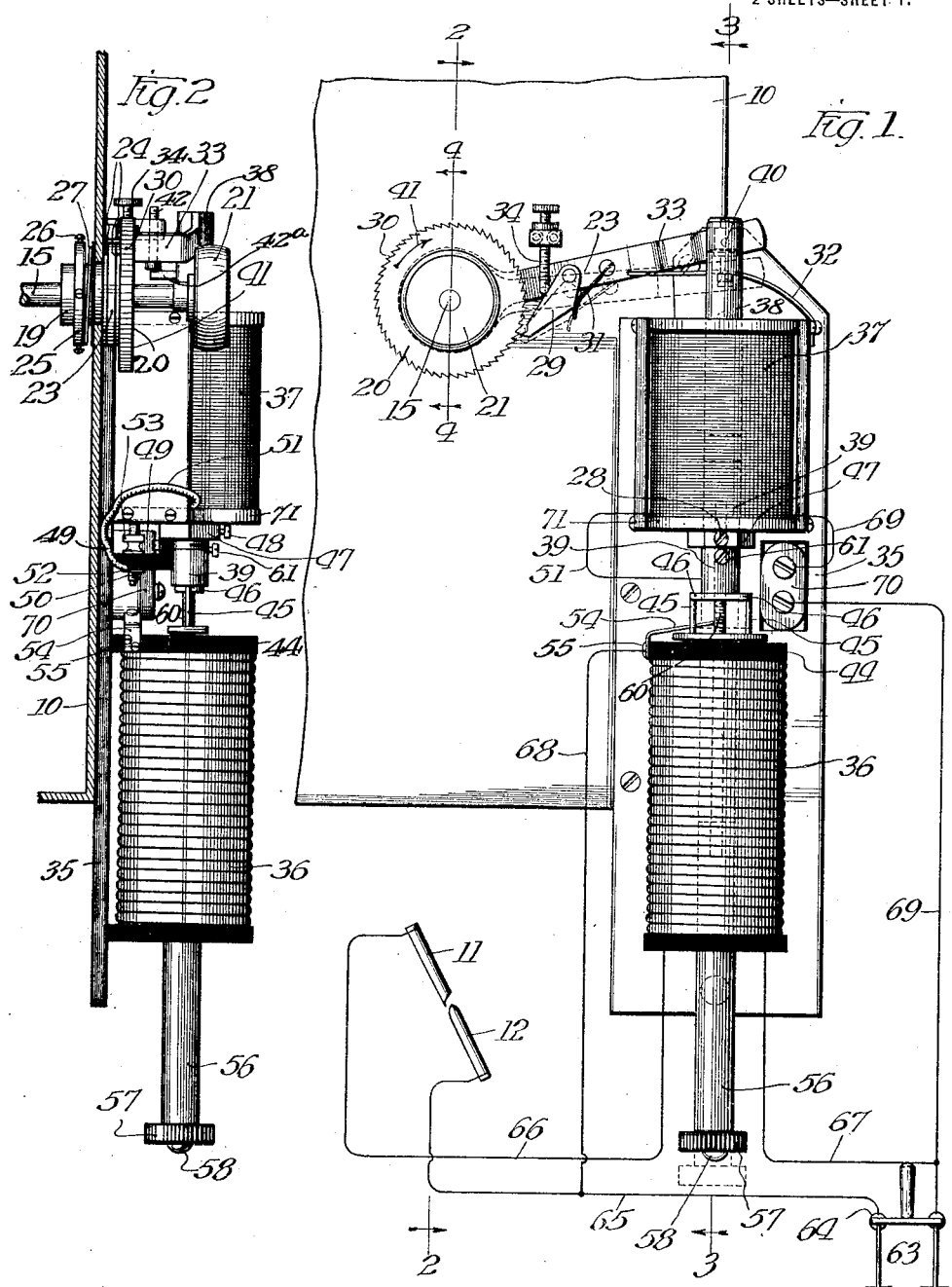

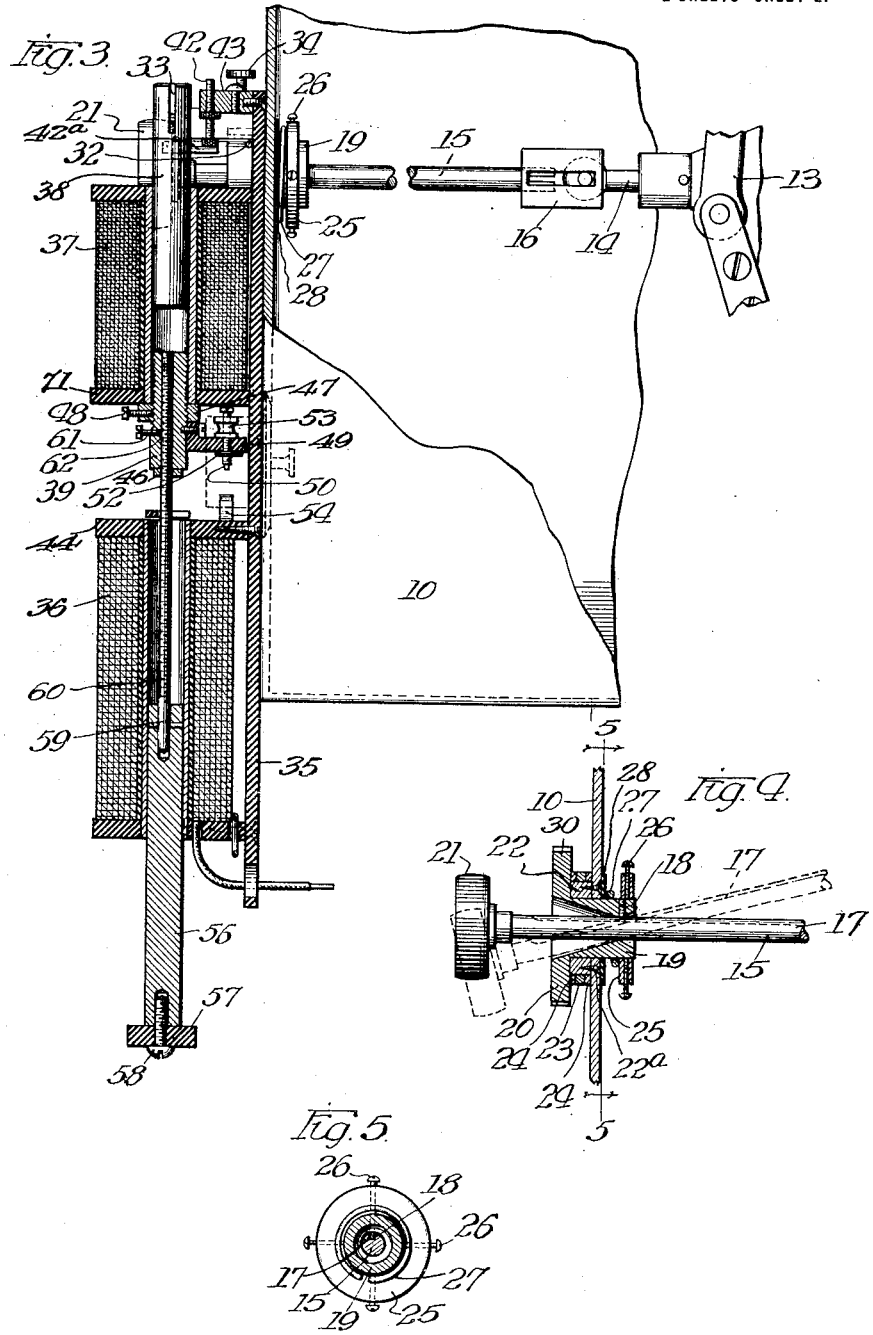

UNITED STATES PATENT OFFICE.

SIDNEY B. BLAKELY, OF CHICAGO, ILLINOIS.

ELECTRIC CONTROLLING AND FEEDING APPARATUS.

1,226,451.        Specification of Letters Patent.        Patented May 15, 1917.

Application filed December 29, 1915. Serial No. 69,200.

*To all whom it may concern:*

Be it known that I, SIDNEY B. BLAKELY, a citizen of the United States, residing at Chicago, in the county of Cook and State of Illinois, have invented certain new and useful Improvements in Electric Controlling and Feeding Apparatus, of which the following is a specification.

My invention relates to improvements in electric controlling and feeding apparatus and has many applications in the regulation, controlling and feeding of electric circuits. It is, however, of particular value when applied to such devices as arc lamps which demand a constant supply of electrical energy, definite in amount.

The salient objects of the invention are, to provide an electrical energy controlling device so that the amount of electrical energy supplied to the circuit from an outside source may be maintained substantially the same under varying conditions; to provide a device of the character described which will influence or control an electrical circuit or the devices included therein from time to time as the conditions of the circuit or the conditions of said devices change, whereby the circuit will always receive the proper amount of current to operate said devices at the desired efficiency; to provide apparatus of the class described of such character that it may be readily constructed or adjusted to meet widely varying current requirements; to provide apparatus of the class described so organized as to admit of extremely close regulation of the current supply; to provide an apparatus of the class described which shall be extremely economical of electrical energy; to provide an apparatus of the class described which may be, if desired, operated by the electrical energy in the circuit to be regulated; to provide a device of the class described which may readily be adapted either to current or voltage control; to provide a construction which shall be extremely simple of design and economical of manufacture, and, in general, to provide an improved apparatus of the character referred to.

The accompanying drawings illustrate a particular embodiment of my invention as employed in the regulation of the electric current supplying an arc lamp for projection purposes. In said drawings—

Figure 1 is a front elevation of the apparatus;

Fig. 2 is a section taken on the line 2—2 of Fig. 1;

Fig. 3 is a section taken on the line 3—3 of Fig. 1;

Fig. 4 is a section taken on the line 4—4 of Fig. 1; and

Fig. 5 is a section taken on the line 5—5 of Fig. 4.

In the drawings I have shown an apparatus particularly designed to maintain constant the amount of current which is supplied to a projection arc lamp, such as is used in stereopticon or moving picture machines. Usually, in fact in almost every instance, the carbons of such lamps are adjusted or regulated entirely by hand. The carbons ordinarily are contained within a large sheet-iron fireproof case or box styled a lamp house, from which project the hand-wheels or screws which control the positions of the carbons. The carbons are generally chosen of such size and composition that the positive and negative carbons will burn away at the same linear speed, which makes it possible to gradually feed said carbons together as they are consumed by means of a double rack or other device operable by a single manually controlled pinion.

In the drawings 10 represents the rear side of the sheet iron lamp house containing the arc lamp carbons 11 and 12, these however being shown in miniature and away from the other apparatus in order to make clear the electrical connections. It is understood that said carbons 11 and 12 may be controlled,—that is to say, made to approach or recede from each other, by means of the usual feeding apparatus, a fragmentary portion of which is indicated at 13 in Fig. 3. The pinion hereinbefore referred to is mounted upon a spindle 14 which is connected to the hand-wheel spindle 15 through a universal joint 16, permitting bodily adjustment of the carbon-supporting apparatus. In applying my invention to a common form of projection lamp, as just described, I prefer to mill in the rod 15 a keyway 17 of such size as to slidably accommodate the end of a small pin 18 set radially into the hub 19 of a ratchet wheel 20. As shown, said ratchet wheel 20 is situated on the outside of the lamp house, between the rear side 10 and the usual hand-wheel 21 mounted on the end of the rod 15, and the hub 19 is coned out or countersunk from either side of the key pin 18 so as to permit angular movement of the rod 15 whenever the element 13 is moved bodily in the lamp house. Between the ratchet disk 20 and the lamp house 10 is an annular collar 22 secured to the lamp house side 10 by flat head screws 22ª or in any other suitable manner. The inside periphery of said collar 22 forms a bearing for the hub 19, and its outer circumference forms a bearing for the rotatable ratchet arm 23. A pair of packing washers 24 prevents contact of the arm 23 with the ratchet wheel or lamp house and prevents undue friction of said arm in its bearing when subjected to transverse stresses. The hub 19 is maintained axially in its proper position by means of an adjustable collar 25 clamped in place upon the inner end of the hub by means of set screws 26. In order to prevent the ratchet wheel from jumping forward a greater amount than the movement imparted to it by means of the ratchet mechanism, to be hereinafter described, I apply thereto frictional drag by means of a large diameter coil spring 27 interposed between the clamping collar 25 and a fiber washer 28, said spring thus forcing the ratchet wheel against the collar 22.

Intermediate the ends of the ratchet arm 23 I pivotally mount a pawl or ratchet dog 29, the end of which is adapted to engage the teeth 30 of the ratchet wheel 20 only when the arm 23 is depressed. To this end, I mount upon the said arm 23 a flat plate spring 31 which engages the under side of said pawl 29 and tends to press the same into engagement with the ratchet teeth. When, however, the arm is forced upward into its normal position by means of a stationary spring member 32, the free end of which engages the lower side of an offset 33 of said ratchet arm 23, the upper side of said pawl engages the end of an adjustable stop 34, thus rocking the pawl upon its pivot and forcing the end thereof out of engagement with the teeth 30 of the ratchet disk 20. When in said normal position, with the pawl disengaged, the hand-wheel 21 may be rotated freely in order to strike the arc or to make such other adjustments as may be performed manually.

Referring now to the controlling apparatus proper, upon the back 10 of the lamp house I mount a fiber plate 35 which supports the electrical devices and connections. In the particular embodiment described, which is wound for current control, the current-controlling relay comprises a series wound solenoid 36 having wire of suitable diameter to accommodate the entire current which is fed to the carbons of the lamp. The ratchet-operating solenoid 37 is preferably mounted directly above and in axial alinement with the series solenoid 36. Said solenoid 37 is preferably of the ironclad type and is equipped with a long upper plunger 38 and a short lower plunger 39. The upper end of said upper plunger 38 is connected to the outer end of the arm 23 by means of a pin 40 operating in a slot in the end of said arm, the end of the plunger being slotted vertically to accommodate the end of said arm 23. It will be obvious that whenever the solenoid 37 is energized it will suck in the plunger 38 and depress the arm 23, thus stepping forward the ratchet wheel 20 in the direction of the arrow 41, this being in the proper direction to feed the carbons together. The upward movement of the plunger 38 under the influence of the spring 32 is limited by means of an adjustable stop which in this instance comprises a screw 42 threaded into a small bracket 43 mounted on the upper end of said fiber plate 35. Said screw is engaged by a pin 42ª fixed in the plunger 38.

The circuit of the ratchet-operating solenoid 37, which is normally deënergized, is controlled by a pair of contacts which are closed when the current in the series coil 36 drops to such a point as no longer to enable it to maintain said contacts in open relation. Describing the mechanism for controlling said contacts, in the upper head 44 of the solenoid 36 I secure a pair of upwardly projecting vertical pins 45 upon which slides a brass plate 46 secured to the end of the plunger 39. The upper portion of said plunger 39 is threaded in order to accommodate a threaded brass collar 47 which may be adjusted thereon, and thus constitutes a stop for limiting the upward movement of said plunger 39. Said collar 47 is maintained in its adjusted position on said plunger 39 by means of a set screw 48. On the rear side of the lower end of said plunger 39 I fasten a small fiber arm or bracket 49, in the end of which is threaded a contact screw 50 adjustable in a vertical direction in said arm. One end of the winding of the ratchet-controlling solenoid 37 is connected to said contact screw by means of a flexible conductor 51, as shown at 52. It is understood that the contact screw 50 is equipped with a suitable lock-nut 53 in order to enable it to maintain its adjustment. The contact screw 50 is adapted, upon the dropping of the plunger 39, to contact with the free end of a flexible plate spring 54, the other end of which is secured as at 55 to the upper head 44 of the series solenoid 36. There is a substantial amount of yield to said plate spring 54 so as to prevent the solenoid 37 from opening its own contact too rapidly.

Describing the series solenoid 36, it will be observed that the same is equipped with a comparatively long plunger or core 56. The lower end of the core 56 is furnished with a small fiber hand-wheel 57 secured thereto by a central screw 58, and in the upper end of said plunger is rigidly secured by means of a pin 59, a brass rod 60, the upper portion of which is threaded for a substantial portion of its length. The upper end of said rod 60 is threaded longitudinally into the lower plunger 39 of the ratchet-operating solenoid 37, so that the plungers or cores 56 and 39 move in unison. The distance between said plungers 39 and 56 is, however, capable of adjustment by means of the threaded rod 60 previously referred to simply by rotating the hand-wheel 57. When the hand-wheel 57 is rotated, the rod 60 is turned in its threaded bearing in the plunger 39, the twisting of the latter being prevented by the vertical slide rods 45 engaging with the plate 46. Preferably, in order to prevent looseness of the rod 60 and consequent loss of adjustment of the parts, I insert in the plunger 39 a set screw 61 which forces a small leather plug 62 into engagement with the threads of said rod 60.

Describing the electrical connections, 63 is an ordinary double-pole switch for switching the current on or off as desired whenever it may be necessary to light or to put out the lamp. Tracing the connections from said switch,—from the positive pole 64 the main current travels by the conductor 65 to the lower carbon 12 through the arc to the carbon 11, thence by a conductor 66 to and through the winding of the series solenoid 36, finally by a conductor 67 to the negative pole of the circuit. As previously stated, the solenoid 37 is normally deënergized. When, however, the current in the series winding 36 falls below a certain amount the core 56 drops and permits the plunger 39 to fall, thus closing the contacts 54 and 50, whereupon the circuit will be as follows. From the positive pole of the battery, the conductor 65, conductor 68, to the contact spring 54, through contact to the contact screw 50, thence by way of the flexible conductor 51 through the winding of the shunt solenoid 37, through a conductor 69 and thence to the negative pole of the current supply. For convenience I interpose in the conductor 69 a single-pole switch 70, of any convenient pattern for opening the circuit of the relay of the solenoid 37 if it be desired to throw off the automatic control for any purpose.

The operation of the device is exceedingly simple and positive. Assuming that the hand-wheel has been properly adjusted for a given current, so long as said current is flowing through the coils of the series solenoid 36, the plunger 56 will be pulled upwardly by the coil, its position being maintained by reason of the collar 47 striking against the lower head 71 of the upper magnet 37. When, however, the carbons 11 and 12 burn away to such a point that the arc is then receiving a current less than that for which the apparatus has been set, the plunger 56 will no longer be attracted with sufficient force to maintain it against its own gravity and that of the connected parts, whereupon it will fall and close the contact 50, 54. Through the circuit previously described the shunt wound ratchet-operating solenoid 37 will be energized and both of the plungers 38 and 39 will be pulled inwardly. Owing, however, to the fact that the plunger 39 is relatively short, and also due to the fact that the plunger 56 is no longer working at a maximum, due to the loss of current and its position in the coil 36, the said plunger 39 is relatively slower in its movement than is the plunger 38, the latter extending a comparatively long distance into the solenoid 37 and having a comparatively small amount of inertia to overcome. For this reason the plunger 38 will complete its downward stroke and step forward the ratchet wheel 30, thereby feeding the carbons toward each other, before the solenoid 37 is deënergized by the opening of the contact 50, 54 by the upward movement of the smaller lower plunger 39. Due to the feeding together of the carbons 11 and 12, the current of the solenoid 36 has been increased so that when the plunger 39 finally is operated by the solenoid 37, the pull of the solenoid 36 is strong enough to support the core 56 in its upper position with the contacts 50 and 54 out of engagement and with the collar 47 pressed upwardly against the bottom head 71 of the solenoid 37.

This apparatus has several advantages over any other device designed to accomplish the same or a similar purpose, which has been heretofore brought to my attention. It will be observed that the arrangement is such that when the current falls below a certain amount, the core 56 and the connected parts drop with rapidly increasing speed and the contact is closed positively with sufficient force to make an efficient electrical connection. The construction also permits the ratchet wheel to be completely operated before the core 56 is restored to its normal position, thus furnishing the series solenoid with sufficient current to hold the core 56 in its upper position as soon as the smaller lower core of the solenoid 37 is operated. An important advantage of this construction is due to the fact that the relations between the ratchet-operating parts and the contact-operating parts and between the several parts of each of said mechanisms are always the same and independent of any current adjustment of the core 56, the gravity of which is of course always constant. This latter feature enables me to make the adjustments permanent, independent of the amount of current for which the device may be adjusted.

In the device described, it should be understood that in case a single movement of the ratchet-operating solenoid does not result in a sufficient increase in current to enable the series solenoid to maintain its off-contact position, the core of the latter will fall and the apparatus will operate a second time, the cycle of movements being repeated as many times as is necessary to increase the current to the proper amount.

To the skilled electrical engineer, it will be manifest that the apparatus is capable of many other applications and may be modified considerably to make it suited to individual needs or tastes. The scope of the invention hence is to be determined, not by the language or the description of the details disclosed, but by reference to the appended claims.

I claim—

1. In apparatus for regulating electric power, the combination of an intermittently operable mechanical device for controlling said power, a normally deënergized helix for operating said device when said helix is energized, an electrically independent, normally inoperative limit relay for controlling the circuit of said helix, and a mechanical connection operative when actuated by the energizing of said helix to exert force on said relay tending to restore the latter to its normal inoperative state.

2. In apparatus for regulating electric power, the combination of an intermittently operable mechanical device for controlling the flow of current in a circuit, a normally deënergized solenoid provided with a core for operating said device to control said flow of current when said solenoid is energized, and having a relay-restoring element also operated by said solenoid when said solenoid is energized, an electrically independent, normally inoperative limit relay associated with the flow of current in the circuit to be regulated and for controlling the circuit of said solenoid, said relay normally maintaining the circuit of said solenoid open, and a mechanical connection extending from said relay to said relay-restoring element for exerting force in a direction tending to restore said relay to its normal inoperative condition.

3. In apparatus for maintaining a constant predetermined amount of flow of electrical energy in a circuit, the combination of magnetic means for regulating the current-consuming capacity of said circuit, said means being normally deënergized, a limiting relay normally energized from said circuit, said relay normally maintaining said magnetic means deënergized and adapted to close the connection upon change of the flow of current in said circuit, and a mechanical connection extending from said magnetic means to said relay for automatically applying force to said relay tending to restore the latter to its normal contact open position.

4. In apparatus for maintaining a constant flow of electrical energy in a circuit having a variable current capacity, the combination of an intermittently operable device for modifying the capacity of said circuit, a normally idle magnet for intermittently operating said device, said magnet also being provided with a local-circuit-opening mechanical connection extending to a relay, and a relay included in the circuit to be regulated normally energized from said circuit and controlling the circuit of said magnet, the circuit of said magnet being normally held open by said relay, which is adapted to close said circuit upon change of current in said main circuit.

5. The combination of an electric arc lamp, means for gradually moving together the carbons as the latter are consumed, a solenoid for operating said means when said solenoid is energized, a series wound solenoid normally energized by current flowing through said arc, contacts controlling the circuit of said first solenoid normally maintained open by said series solenoid when the current flowing through the latter is maintained at a predetermined amount, magnetic means associated with said solenoid and mechanically independent of the carbon-feeding means, and a mechanical connection extending from said last named element for restoring said series solenoid to its normal open contact position when the magnet is energized.

6. The combination of an electric arc lamp, means for gradually moving together the carbons as the latter are consumed, a solenoid for operating said means when said solenoid is energized, a series wound solenoid normally energized by current flowing through said arc, contacts controlling the circuit of said first solenoid normally maintained open by said series solenoid when the current flowing through the latter is maintained at a predetermined amount, magnetic means associated with said solenoid and mechanically independent of the device-operating means, a mechanical connection extending from said last named element for restoring said series wound solenoid to its normal open contact position when the magnet is energized, and a stop for limiting the movement of said mechanical connection, the core of said series solenoid being adjustably secured to said mechanical connection.

7. The combination of a substantially rigid support, a member rotatably mounted on said support and having its axis in fixed position with reference to said support, and a shaft keyed to and slidable in said rotatable member said member having an enlarged recess adjacent the point of its operative connection with the shaft, whereby the latter is capable of a wide range of angular movement with reference to said rotatable member.

8. The combination of a rigid support, a bushing rotatable in but having its axis fixed with reference to said support, a shaft provided with a longitudinal keyway and slidable in said bushing, said bushing being provided with an internal projection engaging said keyway and being enlarged at either side of said projection whereby said shaft may have its axis inclined to the axis of said bushing, said bushing substantially fitting the shaft at the projection and the axis of the bushing and of the shaft always intersecting each other at that point independent of sliding or angular movements of said shaft, the bushing at all times being in driving engagement with said shaft whereby the latter may be rotated by the bushing.

9. In apparatus for regulating electric power, the combination of a device for controlling said power, step-by-step mechanism for operating said device, a normally deënergized helix for operating said step-by-step mechanism when said helix is energized, an electrically independent limit relay for controlling the circuit of said helix, and a mechanical connection actuated by the energizing of said helix operative to exert force on said limit relay tending to restore the latter to its normal position.

10. In apparatus for maintaining a constant flow of electrical energy in a circuit having a variable current capacity, the combination of a device for modifying the capacity of said circuit, step-by-step mechanism for operating said device, a normally idle magnet for effecting successive movements of said step-by-step mechanism, a relay associated with the circuit to be regulated normally energized from said circuit and controlling the circuit of said magnet, and a mechanical connection operable by said magnet and extending to said relay for opening the circuit of said magnet, the circuit of said magnet being normally held open by said relay which is adapted to close said circuit upon change of current in said main circuit.

11. In apparatus for maintaining a constant flow of electrical energy in a circuit having a variable current capacity, the combination of a device for modifying the capacity of said circuit, step-by-step mechanism for operating said device, a solenoid operated with two cores, one of said cores being arranged to operate said step-by-step mechanism, a relay associated with the circuit to be regulated, normally energized from said circuit and controlling the circuit of said magnet, and a mechanical connection extending from the other core of said solenoid and extending to said relay for opening the circuit of said solenoid, said relay being arranged to close the circuit of the solenoid upon change of current in the main circuit.

12. The combination of an electric arc lamp, means for moving together the carbons when the latter are consumed, step-by-step mechanism for operating the carbon-moving means, a solenoid for operating said step-by-step mechanism when said solenoid is energized, a series-wound solenoid normally energized from the arc circuit, contacts controlling the circuit of said first solenoid normally maintained open by said series solenoid when the current flowing through the arc is maintained at a predetermined amount, a core associated with said first solenoid and mechanically independent of the step-by-step mechanism, and a mechanical connection extending from said core for opening the circuit of said relay when said core is energized.

13. The combination of an electric arc lamp, step-by-step ratchet mechanism for gradually moving together the carbons as the latter are consumed, a solenoid provided with two cores, one of said cores being arranged to operate said step-by-step mechanism when said solenoid is energized, a series-wound solenoid mechanically alined with said first solenoid and normally energized by current flowing through the arc, contacts controlling the circuit of said first solenoid normally maintained open by the position of the core of said series solenoid when the current flowing through the arc is of sufficient predetermined amount, and a mechanical connection mechanically independent of the carbon-feeding means and extending from the other core of said solenoid for opening said contacts when the last named core is energized.

SIDNEY B. BLAKELY.

Copies of this patent may be obtained for five cents each, by addressing the "Commissioner of Patents, Washington, D. C."